United States Patent
Schubert

(10) Patent No.: US 7,470,111 B2
(45) Date of Patent: Dec. 30, 2008

(54) WIND TURBINE

(75) Inventor: Matthias Schubert, Rendsburg (DE)

(73) Assignee: Repower Systems AG, Hamburg (DE)

( * ) Notice: Subject to any disclaimer, the term of this patent is extended or adjusted under 35 U.S.C. 154(b) by 633 days.

(21) Appl. No.: 11/125,804

(22) Filed: May 10, 2005

(65) Prior Publication Data

US 2005/0254949 A1 Nov. 17, 2005

(30) Foreign Application Priority Data

May 11, 2004 (DE) ........................ 10 2004 023 773

(51) Int. Cl.
 *F03B 11/00* (2006.01)
(52) U.S. Cl. .................................... 416/155; 416/170 R
(58) Field of Classification Search ...................... 416/1, 416/31, 155, 156, 158, 159
 See application file for complete search history.

(56) References Cited

U.S. PATENT DOCUMENTS 2,032,682 A * 3/1936 Blanchard ................. 416/90 R
5,249,924 A * 10/1993 Brum ........................... 416/48
6,783,326 B2 * 8/2004 Weitkamp et al. ............... 416/1
7,331,761 B2 * 2/2008 Hansen et al. ................. 416/11
2004/0240997 A1 12/2004 Wobben

FOREIGN PATENT DOCUMENTS

DE 10141667 3/2003

* cited by examiner

*Primary Examiner*—Ninh H Nguyen
(74) *Attorney, Agent, or Firm*—Rankin, Hill & Clark LLP

(57) ABSTRACT

A wind turbine equipped with a tower, a nacelle rotatably mounted on the tower, a rotor rotatable at the nacelle about a rotor axis of rotation and including one rotor hub and at least one rotor blade which is coupled by a blade bearing to the rotor hub while rotatable about a blade adjustment axis. The blade bearing includes an inner ring firmly affixed to the rotor hub and an outer ring that is fitted with a toothing and that is firmly connected to the rotor blade. The rotor blade is rotatable by a blade adjustment drive including a drive motor actuating a drive pinion meshing with the outer toothing of the outer ring. On the rotor hub's side away from the nacelle, the drive pinion is configured at an angle of 10 to 30° as measured about the blade adjustment axis to a plane subtended by the rotor axis of rotation and the blade adjustment axis, and the drive motor is mounted at a distance from the rotor axis of rotation that is smaller than the distance between the drive pinion and the rotor axis of rotation.

5 Claims, 4 Drawing Sheets

WIND TURBINE

BACKGROUND OF THE INVENTION

1. Field of the Invention

The present invention relates to a wind turbine comprising at least one blade adjustment system.

2. Description of the Related Art

In wind turbines of this species, a rotor blade is rotatably affixed with a blade bearing to a rotor hub. The blade adjustment system comprises at least one blade adjustment drive fitted with a drive pinion, a gear unit and an electric or hydraulic drive motor. The drive pinion meshes with the external or inner toothed blade bearing.

Such systems must meet several requirements which can be made technically compatible only with difficulties.

In order to minimize the stresses applied to the adjoining structure, the rotor hub and the blade adjustment system should be both low in weight and economical in manufacture.

On the other hand the blade bearing requires very rigid adjacent connection because warping the connecting flange would shorten bearing life.

Moreover the blade adjustment system should apply in economical manner as large as possible a blade adjusting torque, making it desirable to configure the drive pinion as far outward as possible (long lever arm, away from the blade axis).

Also the blade adjustment system involves a complex drive mechanisms that heretofore preferably was sheltered within the rotor hub.

This problem has been widely addressed by screwing the blade bearing external ring into the rotor hub and by fitting the inner ring with an inner toothing and to link it to the rotor blade. In that case the adjustment drives are situated within the hub. This design suffers from the substantive drawback however that on account of the large flange diameter of the outer bearing ring, the rotor hub must be very heavy and of low rigidity, further that, on account of the smaller lever arm, the adjustment drives can apply only lesser adjustment torques than if an outer toothing were used.

By inverting the blade bearing connection (inner ring screwed to the hub, outer ring to the blade), more compact and therefore more rigid hubs could be made in the state of the art, which thereby however again entailed spatial problems in configuring the blade adjustment drives. The inside of the hub no longer offers adequate space, and, outside the hub, spatial accommodation is restricted so much that as a rule the drives are mounted in a manner that either they point outward relative to the drive pinion (like rotor blades), or the drive pinions are mounted centrally on the side of the hub away from the nacelle (centrally in front of the hub's blade flanges).

In that case, for reasons of space, angle drives are used, that is the axes of rotation of the drive pinion and drive motor subtend an angle larger than 45°, as a rule being 90°. Such a system is described in the German patent document DE 101 41 667. The special configuration however is so packed that access to the rotor hub inside and to the rotor blades required for maintenance must be through so-called blade extenders (tubular components with access apertures). In turn blade extenders entail substantial increases in weight and costs.

SUMMARY OF THE INVENTION

Accordingly the objective of the present invention is to avoid the drawbacks of the state of the art and to conceive and implement an especially economical configuration of rotor hub, blade bearing, rotor blade and adjustment drive whereby, employing a minimum of equipment/material jointly with a rigid and compact construction applying large blade adjustment torques. In particular the spatial configuration is selected in a manner that the hub shall be directly accessible.

This problem is solved by the configuration defined in claim 1. The core of the invention is the insight that, by modifying the fore part of the hub contour, the blade adjustment drives can rotated by about 10 to 30°, in especially advantageous manner by 14 to 22°, out of the conventional central position that is away from the nacelle, that is, the drive pinion shall be mounted on the rotor hub side away from the nacelle at an angle of 10 to 30° relative to the axis of rotation of the rotor in the plane subtended by the rotor axis of rotation and the blade adjustment axis.

Furthermore the adjustment drives point inward, i.e., the drive motor is mounted a smaller distance from the rotor axis of rotation than the distance between this axis and the drive pinion. This feature eliminates a main drawback, namely the increased danger of lightning strikes on outwardly pointing adjustment drives, namely in that the equipment of the invention is configured directly in front of the (metallic) rotor hub.

The required hub geometry may even comprise curved recesses in its front zone. However contrary to all prior experience with such designs, it was discovered that such structurally disadvantageous shape only entails negligible additional weight which is fully compensated for by the advantageous configuration of the drives.

In the most advantageous case, the said rotation out of the central position allows using even coaxial blade adjustment drives, that is the drive pinions, the gearing unit, and the drive motor share substantially a common axis of symmetry. However, in crowded circumstances, angle drives also must be used, which however may be configured in a manner to allow access for maintenance through the front (away from the nacelle) access aperture to the inside of the hub. This design in particular allows eliminating additional, heavy and expensive blade extenders. The advantageous, rigidifying effects offered by blade extenders may now be assumed by an appropriate hub geometry, in a particularly advantageous manner by blade flange rigidification. In particular the embodiment of the invention when applied to conventional wind rotors with three rotor blades allows arraying the drives as an equilateral triangle without thereby restricting access through the access aperture.

BRIEF DESCRIPTION OF THE DRAWINGS

Advantageous embodiments of the present invention are elucidated below in relation to the appended drawings.

DETAILED DESCRIPTION OF THE INVENTION

Figure 1:
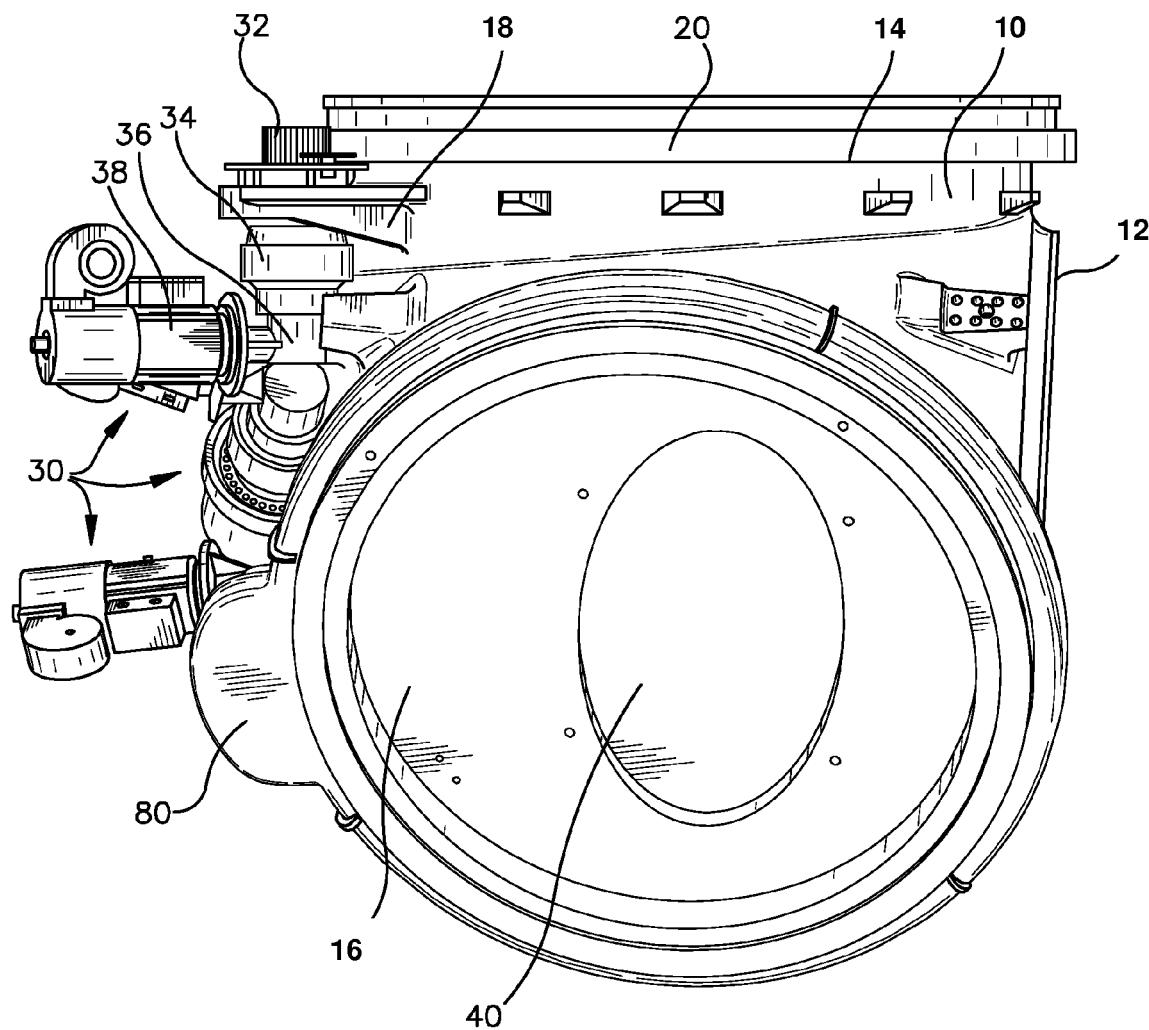
FIG. 1 is a side view of a blade adjustment system of the invention.

FIG. 1 is a side view of a rotor hub 10 having (a total of three) blade adjustment systems, each with one blade adjustment drive 30, of a wind turbine of the present invention. The shaft flange 12 connects to a rotor shaft supported in the nacelle. A blade bearing 20 is mounted on the blade flange 14. The blade adjustment drive 30 resting on a bracket 18 cast onto the hub comprises a drive pinion 32 meshing with the omitted external toothing of the blade bearing 20. Moreover the shown blade adjustment drive comprises a planetary gear unit 34 coaxial with the drive pinion and an angle gear 36 and a drive motor 38. A blade flange rigidifying means 16 fitted with a manhole 40 in this instance shown being elliptical is located in the lower part of the hub 10. This manhole 40 allows maintenance personnel to access—from the inside of the rotor hub 10—the omitted rotor blade. In the shown embodiment mode, the blade flange rigidifying means 16 is made integrally with the rotor hub, though two-part embodiments also are allowable. This rigidification is critically significant in order to attain adequate rigidity at minimal weight in the hub of the invention.

A pinion 80 is present at the lower blade flange. In the advantageous embodiment shown, the drive pinion has been rotated by about 15° from the central position away from the nacelle.

Figure 2:
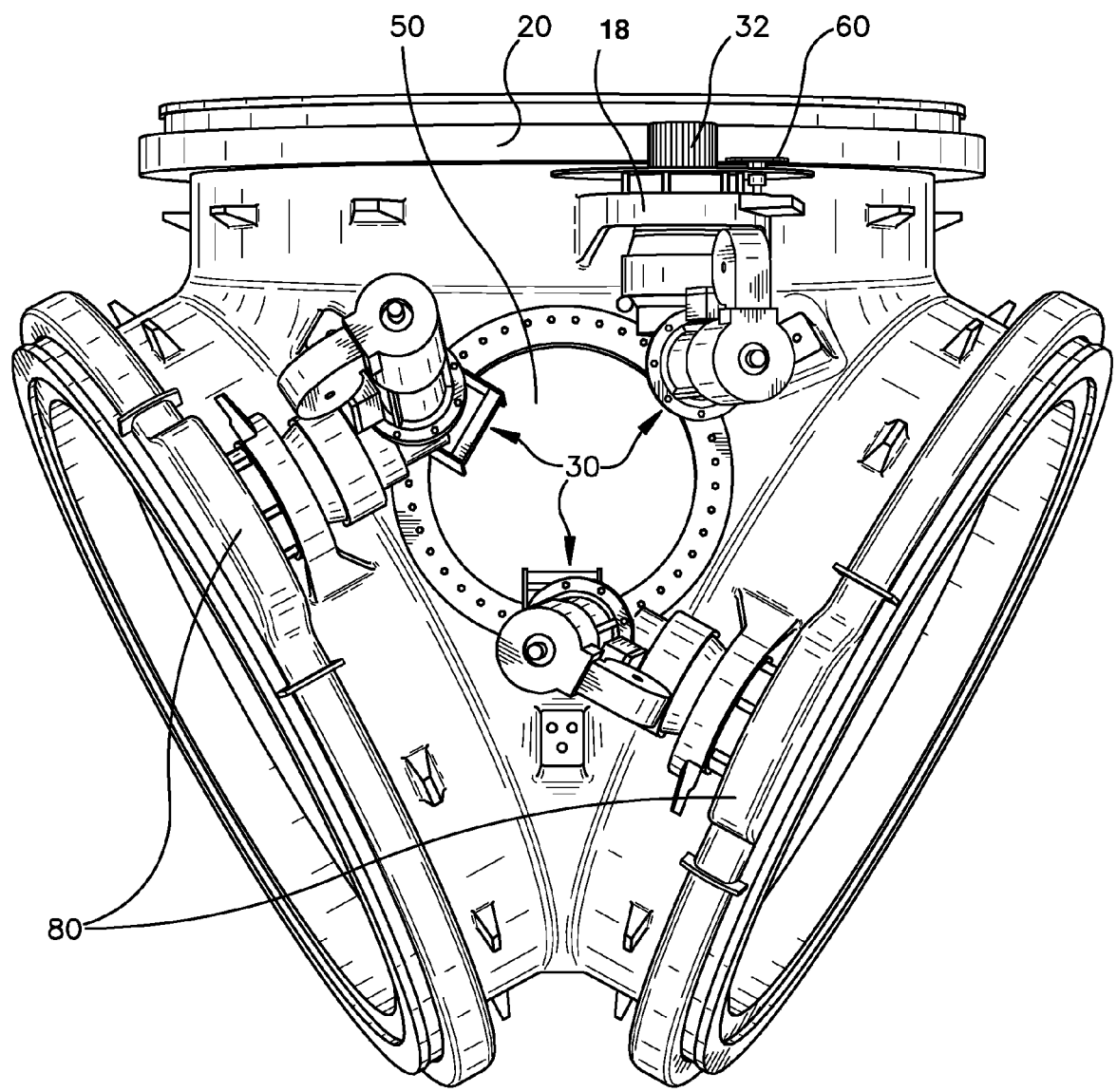
FIG. 2 is a front view of the system of FIG. 1.

FIG. 2 is a front view of the system of FIG. 1 and retains the same reference numerals. The three blade adjustment drives 30 arrayed in the form of an equilateral triangle are configured around the access aperture 50 at the center of the hub. An angle sensor 60 is positioned next to the upper drive pinion 32 and accurately detects the instantaneous blade angle. In one advantageous embodiment mode, the drive pinion 32 and the angle sensor 60 are situated underneath a common cover 80 protecting them against external effects and soiling.

Figure 3:
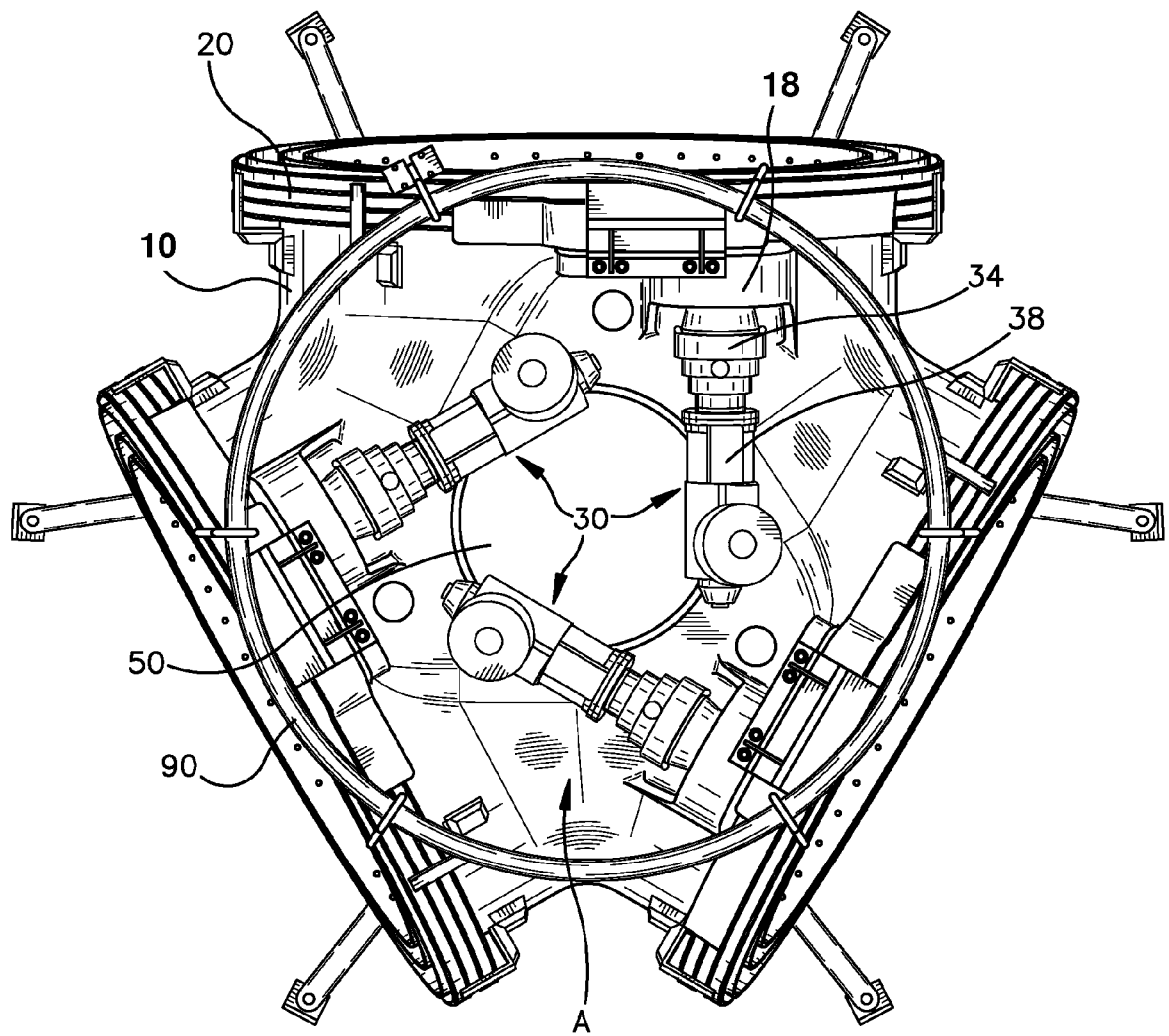
FIG. 3 is a front view of another blade adjustment system of the present invention.

FIG. 3 is the front view of a rotor hub 10 of a further advantageous embodiment mode of the wind turbine of the invention.

In this latter embodiment mode and deviating from the embodiment modes of FIGS. 1 and 2, an angle gear unit may advantageously be eliminated from the blade adjustment drives 30 in that the adjustment drives are made coaxial, that is the drive pinion, the planetary gear drive unit 34 and the drive motor 38 are mounted axially aligned with one another. This feature is made possible by a special, incurving looking hub geometry permitting rotating the drive pinions by 20° out of the central position away from the nacelle. This incurving-appearing zone denoted by A, which can only be indicated with difficulty in two-dimensional drawings, creates the required installation space for the adjustment drive 30. This geometry is present for each of the three adjustment drives. The result is the characteristic configuration of the adjustment drives arrayed as an equilateral triangle about the access aperture 50.

The system of the invention moreover comprises an electrically grounded support ring 90 which is affixed in front of the blade adjustment drive and which on one hand protects the drives from mechanical stresses and lightning and on the other hand also fastens the omitted hub lining (spinner).

Figure 4:
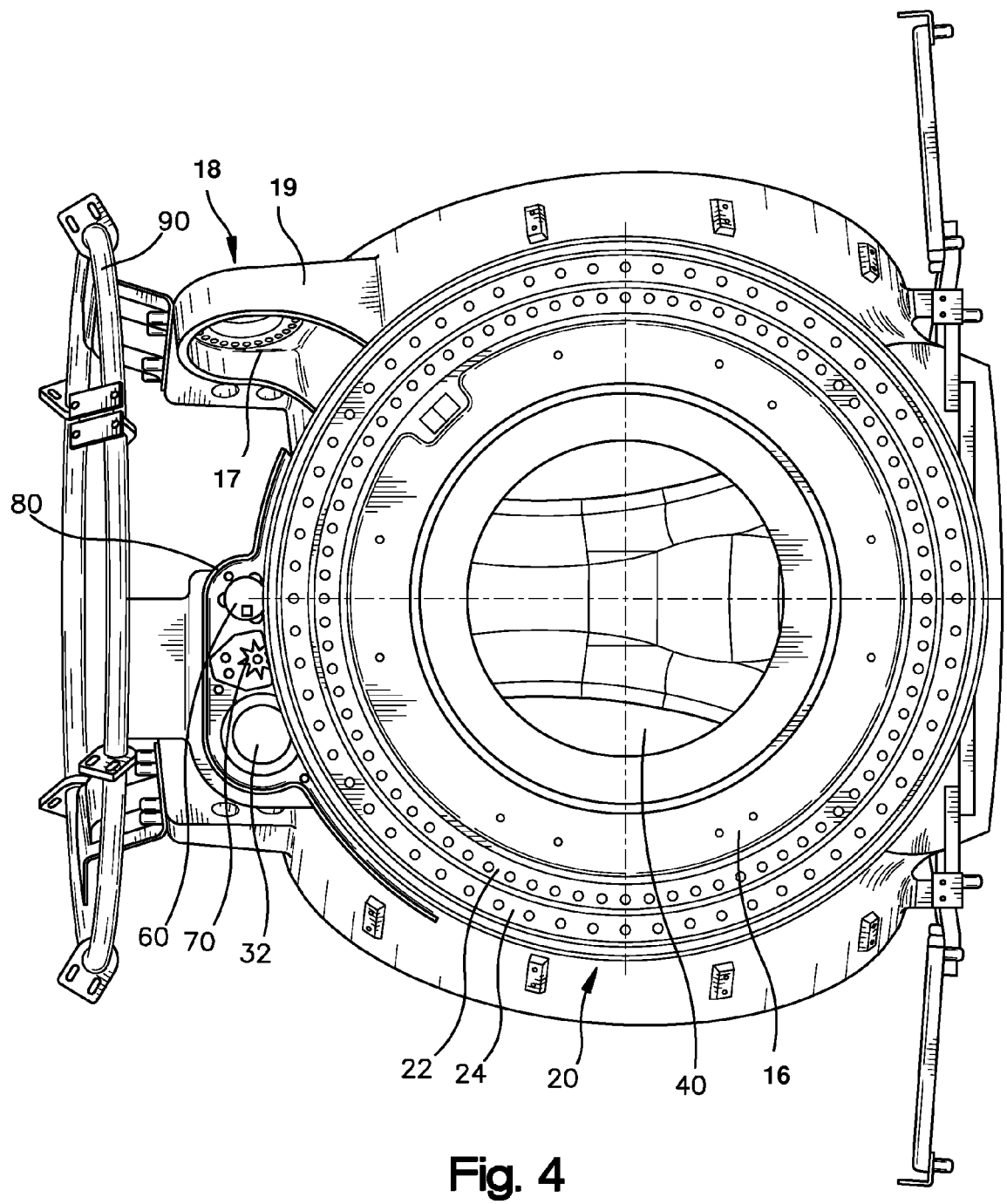
FIG. 4 is a top view of the system of FIG. 3.

FIG. 4 is a top view of the embodiment mode of FIG. 3.

In the latter view, the blade bearing 20 is shown together with the inner ring 22 tightly screwed onto the hub and the outer ring 24 tightly screwed onto the blade. FIG. 4 moreover shows the position of the drive pinion 32 rotated by 20° relative to the central position away from the nacelle. Both a lubrication pinion 70, which is suitable to continuously deposit a lubricant, and an angle sensor 60 are situated next to the drive pinion 32. In one advantageous embodiment mode, the drive pinion 32, the lubrication pinion 70 and the angle sensor 60 are configured underneath a common cover means 80 of which lid is shown transparent in this Figure. In another advantageous embodiment mode, only the lubrication pinion 70 and the drive pinion 32 are configured underneath a common cover means. The latter feature offers the advantage or protecting the sensitive angle detectors 60 from surplus lubricant.

The drawing shows the circumferential flange-shaped rigidification of the blade flange 16 together with the manhole 40 which in this instance is also circular.

An advantageous embodiment of the bracket 18 cast onto the hub 10 is furthermore shown at the top portion of said hub by omitting the adjustment drive 30 in said portion, said bracket consisting of a flange surface 14 to screw the adjustment drive 30 to a circumferential fitting 19.

The invention claimed is:

1. A wind turbine equipped with a tower, a nacelle rotatably mounted on the tower, a rotor rotatable at the nacelle about a rotor axis of rotation and comprising one rotor hub and at least one rotor blade which is coupled by a blade bearing to the rotor hub while rotatable about a blade adjustment axis, the blade bearing comprising an inner ring firmly affixed to the rotor hub and an outer ring having toothing and that is firmly connected to the rotor blade, the rotor blade being rotatable by a blade adjustment drive comprising a drive motor actuating a drive pinion meshing with the outer toothing of the outer ring, wherein, on the rotor hub's side away from the nacelle, the drive pinion is configured at an angle of 10 to 30° as measured about a blade adjustment axis toward a plane subtended by the rotor axis of rotation and the blade adjustment axis, and wherein the drive motor is mounted at a distance from the rotor axis of rotation that is smaller than a distance between the drive pinion and the rotor axis of rotation.

2. The wind turbine as claimed in claim 1, further comprising at least two blade adjustment drives configured in a manner that an access aperture to the rotor hub remains between the blade adjustment drives.

3. The wind turbine as claimed in claim 2, wherein the blade adjustment drives are arrayed in the form of an equilateral triangle.

4. The wind turbine as claimed in claim 1, wherein the blade adjustment drive is fitted with a planetary gear drive unit, and wherein axes of rotation of the planetary gear unit and drive pinion are coaxial.

5. The wind turbine as claimed in claim 1, wherein the drive motor's axis of rotation runs essentially parallel to or coaxially with the drive pinion's axis of rotation.

* * * * *